United States Patent Office 3,424,751
Patented Jan. 28, 1969

---

3,424,751
SELECTED 2-FORMYL- AND 2α-(CYANOAMIDINO)-
A-NOR-5α-ANDROSTANE DERIVATIVES
Richard M. Scribner, Wilmington, Del., assignor to E. I.
du Pont de Nemours and Company, Wilmington, Del.,
a corporation of Delaware
No Drawing. Filed Oct. 20, 1965, Ser. No. 499,017
U.S. Cl. 260—247.2                                    10 Claims
Int. Cl. C07c 173/10, 171/06

---

ABSTRACT OF THE DISCLOSURE

Described and claimed are:
(1) The 2-formyl-A-nor-5α-androstane derivatives of the formula

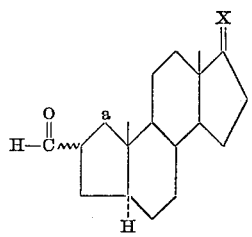

where X is =O or the group

where $R^1$ is hydrogen or a hydrocarbon acyl group of 1 to 12 carbons and $R^2$ is H, $CH_3$, $C_2H_5$, $CH=CH_2$ or $C≡CH$, and $a$ is a single bond or a double bond;
(2) The acetals of these 2-formyl steroids with ethylene or 1, 2-propylene glycol; and
(3) The 2α-(cyanoamidino)-A-nor-5α-androstane derivatives of the formula

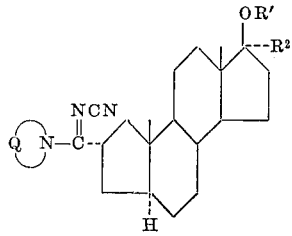

where $R^1$ and $R^2$ are as above and Q is alkylene of 4–5 chain carbon atoms and a total of 4–6 carbon atoms or 3-oxa-1, 5-pentylene.

---

FIELD OF THE INVENTION

This invention relates to certain novel steroid compounds and to processes for preparing them. More specifically, this invention is concerned with certain A-nor-5α-androstane derivatives substituted in the 2 position with a formyl or a cyanoamidino group.

DETAILS OF THE INVENTION

The novel products of the invention are:
(1) The 2-formyl-A-nor-5α-androstane derivatives of the formula I
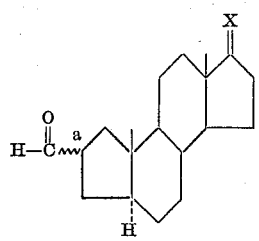

where X is =O or the group

where $R^1$ is hydrogen or a hydrocarbon acyl group of 1 to 12 carbons and $R^2$ is H, $CH_3$, $C·H_5$, $CH=CH·$ or $C≡CH$, and $a$ is a single bond or a double bond;
(2) The acetals of these 2-formyl steroids with lower ethylene or 1, 2-propylene glycol; and
(3) The 2α-(cyanoamidino)-A-nor-Aα-androstane derivatives of the formula II
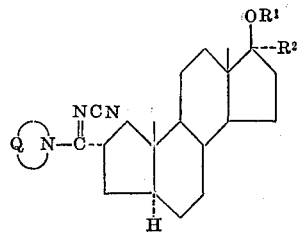

where $R^1$ and $R^2$ are as above and Q is alkylene of 4–5 chain carbon atoms and a total of 4–6 carbon atoms, or is 3-oxa-1,5-pentylene.

The novel 2α-(cyanoamidino)-A-nor-5α-androstanes are prepared by reacting cyanogen azide with a steroid enamine of the formula

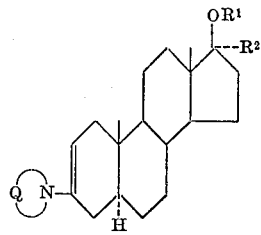

where $R^1$, $R^2$, and Q are as above, in the temperature range of 0 to 50° C. The enamine reactant can be prepared by known methods, e.g., by treating a 3-ketoandrostane with a secondary cyclic amine of the formula

where Q is defined above, such as pyrrolidine, piperidine, 4-methylpiperidine or morpholine. The enamine is dissolved in a dry inert organic solvent, for example lower alkyl alkanoates such as methyl acetate, ethyl acetate, ethyl propionate, ethyl butyrate; lower alkanenitriles such as acetonitrile, propionitrile; aromatic hydrocarbons such as benzene, toluene, and the like. A solution of cyanogen azide in a suitable solvent such as ethyl acetate or acetonitrile is added while maintaining the temperature in the range of 0–50°C., preferably 15–30°C. The reaction mixture is stirred until nitrogen evolution ceases. Pressure is not critical and atmospheric pressures are employed for convenience. Reaction proportions are not critical, but for preferred results a 1:1 ratio of azide to steroid is normally employed. The product is isolated by filtration or, if it is soluble in the solvent, by evaporation of the solvent. It is either used directly in subsequent reactions, or, preferably, purified by fractionl crystalization or chromatography.

The azide employed must be used in solution, for when it is dry or nearly dry, it is an explosive material.

The novel compounds of Formula I where $a$ is a single bond and X is

$R^3$ being H, $CH_3$, $C_2H_5$ or $CH=CH_2$, i.e., all of the $R^2$ groups defined above except $C\equiv CH$, are prepared by reacting a 2α-(cyanoamidino) - A - nor-5α-androstane obtained above and having the

group with an alkali metal at a temperature between about —80° and +20° C. in an anhydrous, liquid reaction medium which is a 1-2 carbon monoalkylamine or ammonia, and hydrolyzing the reaction product under neutral to basic conditions.

The 2α-(cyanoamidino)-A-nor-5α-androstane is dissolved or dispersed in anhydrous liquid ammonia, methylamine or ethylamine. To this solution or suspension, which preferably but not necessarily also contains 2–3 molar equivalents of a buffer such as ammonium acetate, is added a slight excess of an alkali metal (sodium or potassium can be used, but lithium is preferred) at a temperature between —80° to 20° C. After cessation of the initial reaction, as evidenced by abrupt color change from colorless or yellow to blue, the mixture is stirred for a few minutes and then treated with excess ammonium chloride until the blue color is discharged. Addition of water or aqueous base and extraction with an organic solvent, followed by hydrolysis, conveniently accomplished by chromatography on hydrated alumina, gives the 2-formyl-A-nor-5α-androstane.

The products resulting from the foregoing novel processes can be subjected to further transformation to obtain additional products of the invention. Thus, the 2-formyl-A-nor-5α-androstanes obtained as described in the preceding paragraph can be selectively dehydrogenated to the corresponding 2-formyl-A-nor-5α-1-androstenes by treatment in the presence of an acidic catalyst with 2,3-dichloro-5,6-dicyano-p-benzoquinone. The 2-formyl group can be acetalized by treatment with a 1,2-alkanediol such as ethylene glycol or 1,2-propylene glycol. From these acetals which also have a 17-keto group, the 17α-ethynyl-2-formyl-A-nor-5α-androstanes or 1-androstenes are obtained by reaction with an ethynylating agent such as sodium acetylide or ethynylmagnesium bromide, followed by hydrolysis of the 2-acetal group.

Those 2-formyl-A-nor-5α-androstanes or 1-androstenes which also have a 17β-hydroxyl can be esterified to obtain the corresponding 17β-acyl compounds. In addition, those 17β-hydroxyl compounds which have no 17α-substituent can be converted to the corresponding 17-keto steroids by treatment with an appropriate oxidizing agent such as chromium trioxide.

The foregoing products and processes are illustrated in the examples which follow.

In these examples, the Greek letter ξ (xi) used in some of the names and the bond symbol ∿ used in some of the formulas signify that the crude produce is a mixture of alpha and beta epimers or that the compound is of uncertain configuration.

SPECIFIC EMBODIMENTS OF THE INVENTION

Example 1.—2α-(pyrrolidinocyanoiminomethyl)-A-nor-5α-androstan-17β-ol

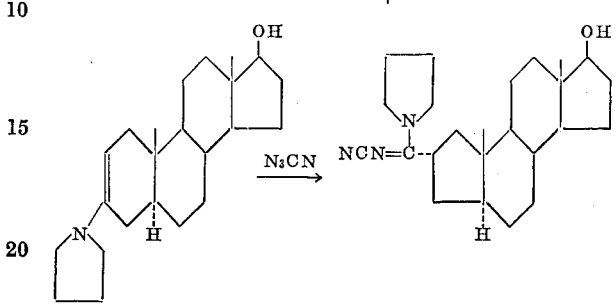

3-pyrrolidino-5α-androst-2-en-17β-ol was prepared by refluxing a solution of 10 g. (34.5 mmoles) of androstanolone, 10 ml. of pyrrolidine, and 100 ml. of benzene and collecting the distillate in a water trap. After 1.5 hours, about 0.76 ml. of water was collected. Evaporation of the benzene solution to dryness under reduced pressure, and trituration of the residue with petroleum ether, gave about 11 g. of an almost colorless solid that was dried under reduced pressure over calcium chloride at 78° C.

Analysis.—Calcd. for $C_{23}H_{37}NO$: C, 80.41; H, 10.86; N, 4.08. Found: C, 80.41; H, 10.92; N, 3.93.

A suspension of 1.82 g. (5 mmoles) of the above Δ²-enamine in 30 ml. of ethyl acetate was stirred vigorously while 2.0 ml. of 2.80 M (5.6 mmoles) of cyanogen azide in ethyl acetate was added dropwise over a period of about 5 minutes. During this time the temperature of the reaction mixture was maintained at 24–27° C. by external cooling with a water bath. During the addition of cyanogen azide, nitrogen was evolved rapidly and in close to quantitative yield as judged by use of a wet-test meter. After completion of the addition of cyanogen azide, the reaction mixture was stirred for 1.25 hours at room temperature and then filtered to remove the insoluble precipitate. After being rinsed with ether and air-dried, the solid weighed 1.5 g., and melted at 245–250° C. with decomposition. Purification of a portion of the 2α-(pyrrolidinocyanoiminomethyl) - A - nor - 5α - androstan - 17β-ol was accomplished by dissolving 0.4 g. in 75 ml. of boiling benzene and filtering the hot solution. To the filtrate 15 ml. of hexane was added. After 1 hour a white crystalline product weighing 0.3 g. was collected by filtration. An analytical sample was prepared by a second crystallization from benzene-hexane and melted at 261.5–263.5° C. with decomposition.

$\nu_{max.}^{Nujol}$ 3690 (OH); 2180 (C≡N); 1560 (C=N) cm.$^{-1}$ $\lambda_{max.}^{EtOH}$ 250 mμ (ε=16,600)

Proton magnetic resonance (CDCl₃, internal tetramethylsilane): singlet at 2.60τ (OH; triplet at 6.42τ (2,5-methylene hydrogens of pyrrolidine); singlet at 9.27τ (angular CH₃), with ratio of triplet to singlet about 4:6.

Analysis.—Calcd. for $C_{24}H_{37}N_3O$: C, 75.15; H, 9.72; N, 10.92. Found: C, 74.82; H, 9.41; N, 10.94.

Chromatography of the crude product on neutral (activity grade III) alumina could also be used to purify the amidine. In this manner, 0.5 g. of crude product gave about 0.35 g. of white needles, M.P. 274–275° C. dec. having an infrared spectrum identical to that obtained for the amidine purified by crystallization.

Analysis.—Calcd. for $C_{24}H_{37}N_3O$: C, 75.15; H, 9.72; N, 10.96. Found: C, 75.31; H, 9.60; N, 10.72.

In similar manner the acetate, propionate, valerate, undecanoate, bicyclo[2.2.2]-octane-1'-carboxylate, adamantane-1'-carboxylate, and homoadamantane-1'-carboxylate esters of 17β-hydroxy-5α-androstan-3-one are converted to enamines and thence by the action of cyanogen azide to the corresponding esters of 2α-(pyrrolidinocyanoiminomethyl)-A-nor-5α-androstan-17β-ol.

Instead of pyrrolidine, other equivalent cyclic secondary amines, such as 4-methylpyrrolidine, piperidine or morpholine can be used to prepare the corresponding Δ²-enamines by reaction with androstanolone, and these products can be treated with cyanogen azide as described to give the corresponding 2α-(cyanoamidino)-A-nor-5α-androstan-17β-ols. Thus, the 2α-[(4-methylpyrrolidino)cyanoiminomethyl], the 2α-(piperidinocyanoiminomethyl) and the 2α-(morpholinocyanoiminomethyl)-derivatives may be prepared.

Example 2.—17α-methyl-2α-(pyrrolidinocyanoiminomethyl)-A-nor-5α-androstan-17β-ol

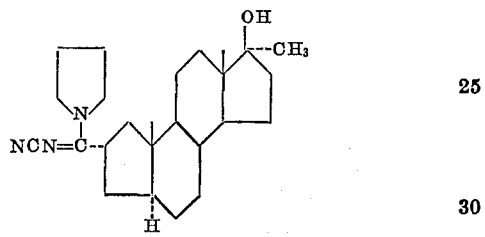

A solution of 20.0 g. (66 mmoles) of 17α-methyl-17β-hydroxy-5α-androstan-3-one and 20 ml. of distilled pyrrolidine in 100 ml. of benzene was heated under a reflux condenser fitted with a water trap for 3.5 hours. Evaporation of the dry benzene solution to dryness gave a white solid which was dried further, to remove traces of pyrrolidine, by heating it at 70–75° C. at about 0.1 mm. pressure for 1 hour. The resulting, dry Δ²-enamine was added to 400 ml. of ethyl acetate which had been purified by passage through neutral (activity grade I) alumina and the mixture was maintained at 20–20° C. with vigorous stirring while 30 ml. of 2.24 molar (67 mmoles) of cyanogen azide in ethyl acetate was added dropwise over a period of 0.5 hour. After 12 hours at room temperature the reaction had evolved a total of 1540 ml. (94% of theory) of nitrogen. The crude, sparingly soluble cyanoamidine, which was collected by filtration and washed with two 50-ml. portions of fresh ethyl acetate, weighed 17.2 g., M.P. 250–252° C. dec. Purification was accomplished by extracting the crude material with boiling toluene (150 ml./g.), filtering, and diluting the cooled filtrate with equal volume of petroleum ether (B.P. 30–60° C.). This gave a total of 12.9 g. of 17α-methyl-2-(pyrrolidinocyanoiminomethyl)-A-nor-5α-androstan-17β-ol as an almost colorless powder, M.P. 262–264° C. dec.

$\nu_{max.}^{CHCl_3}$ 3750, 3650 (OH), 2200 (C≡N), 1568 (C=N) cm.⁻¹

$\lambda_{max.}^{EtOH}$ 251 mμ (ε=16,400)

Analysis.—Calcd. for $C_{25}H_{39}N_3O$: N, 10.57. Found: N, 10.46.

In similar manner, 17α-ethyl-17β-hydroxy-5α-androstan-3-one is converted to an enamine and then to a 17α-ethyl-2α-(pyrrolidinocyanoiminoethyl)-A-nor - 5α - androstan-17β-ol and 17α-vinyl-17β-hydroxy-5β-androstan-3-one is converted to an enamine and then to 17α-vinyl-2α(pyrrolidinocyanoiminomethyl) - A - nor - 5α - androstan-17β-ol.

As with the product of Example 1, other cyclic secondary amines may be employed, such as those mentioned in Example 1.

Example 3.—17α-ethynyl-2α-(pyrrolidinocyanoiminomethyl)-A-nor-5α-androstan-17β-ol

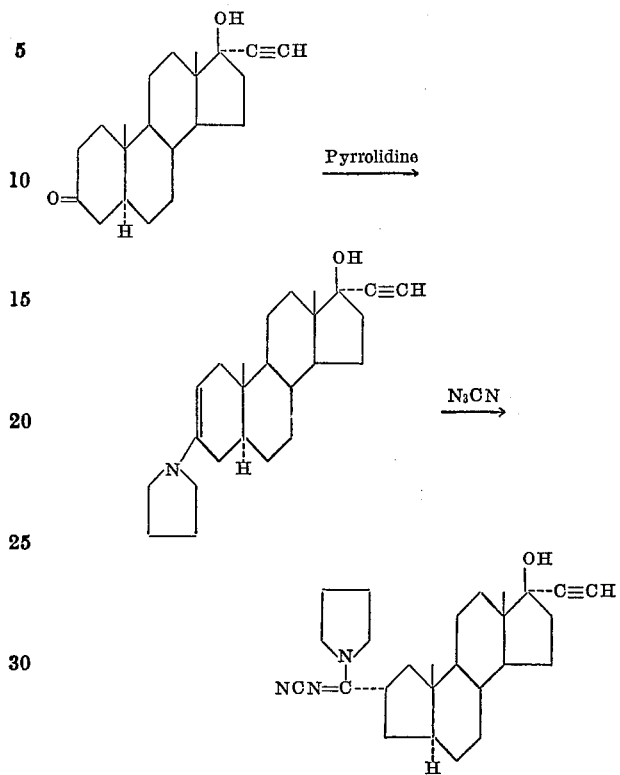

The starting material, 17α-ethynyl-17β-hydroxy-5α-androstan-3-one, was prepared as follows:

Fourteen grams (50 mmoles) of 5α-androstane-3,17-dione was converted to 3-pyrrolidino-2-androsten-17-one with 10 ml. of pyrrolidone by a procedure exactly analogous to that described in Example 2 above.

A solution of ethynyl magnesium bromide in tetrahydrofuran was prepared by adding 50 ml. of 3 M methyl magnesium bromide to 200 ml. of dry tetrahydrofuran, removing 80 ml. of solvent by distillation, adding 300 ml. more of dry tetrahydrofuran, and passing purified acetylene into the ice-cooled solution for 1.5 hours.

To the Grignard reagent was added the crude, carefully dried 3-pyrrolidino-2-androstan-17-one and the mixture was heated at reflux temperature for 5.5 hours. The recation mixture was distilled until 250 ml. of solvent had been removed and, after cooling, it was poured with stirring into 1 liter of water containing 150 g. of ammonium chloride. After 15 minutes, the white solid was collected by filtration and air-dried for 48 hours. Crystallization of 1 g. of the 15 g. of crude product from dioxane-water, followed by washing with a small amount of acetone, gave 0.5 g. of 17α-ethynyl-17β-hydroxy-5α-androstan-3-one, M.P. 293–295° C.

$\nu_{max.}^{Nujol}$ 3330 (≡CH), 1700 (C=O) cm.⁻¹

The crude 17α-ethynyl-17β-hydroxy-5α-androstan-3-one was converted to the Δ²-enamine with 15 ml. of pyrrolidine and 400 ml. of benzene by the procedure described in Example 2. The dry enamine was treated with 22.0 ml. of 2.24 M cyanogen azide in 500 ml. of ethyl acetate at 20–25° C., giving a cyanoamidine which was soluble in the reaction medium. Filtration of the reaction mixture to remove a trace of brown gum followed by evaporation in vacuo to about 100 ml. and dilution with about 400 ml. of petroleum ether gave 18 g. of cream-colored solid, M.P. 195–205° C., 17 g. of which was applied to a column of 500 g. of neutral (activity III) alumina in chloroform. Elution with benzene-petroleum ether (3:1) then benzene-chloroform (4:1) gave in the latter eluate a colorless glass which, on trituration with benzene, gave 8.4 g. of 17α-ethynyl-2α-(pyrrolidinocyanoiminomethyl)-A-nor-5α-androstan-17β-ol, M.P. 252–257° C. Analytical sample was prepared by crystalliaztion from benzene, M.P. 254–255° C.; $\alpha_D^{24}$ −8° (c., 1.8 chloroform).

$\nu_{max.}^{CHCl_3}$ 3620 (OH), 3330 (≡CH), 2180 (C≡N), 1560 (C=N) cm.$^{-1}$

Analysis.—Calcd. for $C_{26}H_{37}N_3O$: C, 76.61; H, 9.15; N, 10.31. Found: C, 76.64; H, 9.17; N, 10.20.

As in Example 1, other secondary amines, such as those mentioned in that example, may be used.

Example 4.—2ξ-formyl-A-nor-5α-androstan-17β-ol

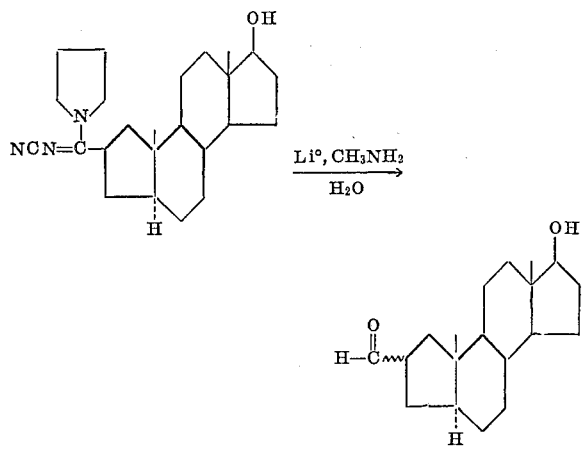

To a solution of 0.50 g. (1.3 mmoles) of 2α-(pyrrolidinocyanoiminomethyl) - A - nor - 5α - androstan-17β-ol in about 100 ml. of methylamine cooled in a Dry Ice-acetone bath was added enough lithium ribbon to impart to the reaction mixture a persistent, dark blue color. After 1.5 hours, the blue solution was treated with sufficient ammonium chloride to discharge its color. The methylamine was allowed to evaporate overnight and the residue was treated with water and sodium hydroxide (the steroid at this point is an amine, soluble in aqueous acid) The aqueous mixture was extracted with ether and the extract was washed with saturated sodium chloride solution, dried and evaporated. Application of a benzene solution of the residue to 15 g. of acid alumina (activity III) gave, on elution with 1:1 petroleum ether-benzene and then with benzene, 174 mg. of 2ξ-formyl-A-nor-5α-androstan-17β-ol, M.P. 109–120° C. after crystallization from hexane, $\alpha_D^{24}$ −5° (c., 1.0 chloroform).

$\nu_{max.}^{CHCl_3}$ 3600, 3440 (OH); 2720, 1715 (CHO) cm.$^{-1}$

Analysis.—Calcd. for $C_{19}H_{30}O_2$: C, 78.57; H, 10.41. Found: C. 78.87; H, 10.48.

The proton NMR spectrum shows that this aldehyde is a mixture of C-2 epimers.

Example 5.—2ξ-formyl-A-nor-5α-androstan-17β-ol

The following process represents an improvement over that of Example 4:

To a stirred solution of 20.8 g. (54 mmoles) of 2α-pyrrolidinocyanoiminomethyl) - A - nor - 5α - androstan-17β-ol in about 700 ml. of methylamine cooled in a Dry-Ice-acetone bath was added 9 g. (115 mmoles) of ammonium acetate. After about 15 minutes, 2.0 g. (excess) of lithium ribbon, which had been cut into small pieces and washed with cyclohexane, was added all at once. Exactly 5 minutes after persistent dark blue color first pervaded the reaction mixture, the mixture was treated with sufficient ammonium chloride (about 30 g.) to discharge the blue color. The methylamine was allowed to evaporate overnight and the residue was taken up in water and ether. The water layer was extracted with ether and the ether layers were combined, washed with saturated sodium chloride solution, and dried over sodium sulfate. Evaporation in vacuo gave 17.2 g. of steroid as a white solid. Application of this product as a solution in 70 ml. of benzene to a column of 500 g. of basic alumina (activity III) and elution with benzene gave 13.6 g. (86% yield of 2ξ-formyl-A-nor-5α-androstan-17β-ol as a nearly colorless glass.

$\nu_{max.}^{CHCl_3}$ 3600, 3450 (OH); 2720 (CHO); (1715) (CHO) cm.$^{-1}$

Example 6.—17α-methyl-2ξ-formyl-A-nor-5α-androstan-17β-ol

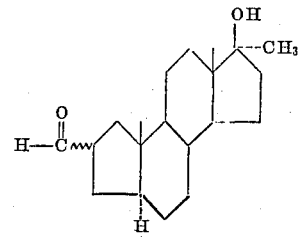

This compound was prepared from 12.0 g. of 17α-methyl - 2α - (pyrrolidinocyanoiminomethyl) - A-nor-5α-androstan-17β-ol by a procedure analogous to that described in Example 4. The 17α-methyl-2-formyl-A-nor-5α-androstan-17β-ol was obtained pure in 23% yield; M.P. 120.5–127.5° C.; $\alpha_D$ −21° (c., 1.2 CHCl$_3$).

$\nu_{max.}^{CHCl_3}$ 3700, 3560 (OH); 2780 (CHO); 1730 (CO) cm.$^{-1}$

Analysis.—Calcd. for $C_{20}H_{32}O_2$: C, 78.89; H, 10.59. Found: C, 79.13; H, 10.56.

The proton nuclear magnetic resonance spectrum (CCl$_4$, tetramethylsilane internal) indicated that the aldehyde was a mixture of about 2 parts of the alpha formyl- and 1 part of the beta formyl-A-nor-steroids. The aldehydic hydrogens appeared as two doublets centered at about 0.35τ; the less shielded hydrogen (area 1) undergoing coupling J=1.2 cps.; the more shielded hydrogen (area 2) undergoing coupling with J=2.0 cps.

Example 7.—17α-methyl-2ξ-formyl-A-nor-5α-androstan-17β-ol

The following process represents an improvement over that of Example 6:

By a procedure analogous to that described in Example 5, 8.0 g. of 17α-methyl-2α-(pyrrolidinocyanoiminomethyl)-nor-5α-androstan-17β-ol in 400 ml. of methylamine, with 3.5 g. of ammonium acetate and 0.85 g. of lithium, was converted to 5.7 g. of 2ξ-formyl-A-nor-5α-androstan-17β-ol, which after crystallization from acetonehexane gave 4.86 g. (80% yield) of crystalline product.

Likewise, 17α - ethyl - 2α - (pyrrolidinocyanoiminomethyl)-A-nor-5α-androstan-17β-ol is reduced to 17α-ethyl - 2ξ - formyl - A - nor - 5α - androstan - 17β - ol, and 17α - vinyl - 2α - (pyrrolidinocyanoiminomethyl)-A-nor-5α-androstan-17β-ol is reduced to 17α-vinyl-2ξ-formyl-A-nor-5α-androstan-17β-ol.

Example 8.—2-formyl-A-nor-5α-androst-1-en-17β-ol

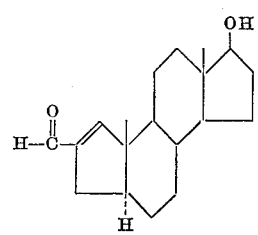

A solution of 1.16 g. (4 mmoles) of 2ξ-formyl-A-nor-5α-androstan-17β-ol, 1.30 g. (5.8 mmoles) of 2,3-dichloro-5,6-dicyano-p-benzoquinone, and 60 mg. (0.3 mmole) of p-toluenesulfonic acid monohydrate in 150 ml. of benzene was heated at reflux temperature for 1.3 hours. The mixture was cooled, 150 ml. of ether was added, and the mixture was extracted with four 100-ml. portions of cold 5% sodium hydroxide. The organic layer was washed with water and with saturated aqueous sodium chloride, and then dried over sodium sulfate and evaporated in vacuo, giving 1.15 g. of yellow solid which was chromatographed on 50 g. of neutral (activity III) alumina. Elution with benzene gave 1.0 g. of 2-formyl-A-nor-5α-androst-1-en-17β-ol which, after crystallization from acetone-hexane, weighed 0.692 g. (60% yield); M.P. 137.5–138.5° C.; $\alpha_D^{23}+77°$ (c., 0.8 $CHCl_3$).

$\nu_{max.}^{CHCl_3}$ 3570, 3480 (OH), 1670 (C=O), 1588 (C=C) cm.$^{-1}$ $\lambda_{max.}^{EtOH}$ 240 mμ ($\epsilon$=14,100)

*Analysis.*—Calcd. for $C_{19}H_{28}O_2$: C, 79.12; H, 9.79. Found: C, 79.41; H, 9.80.

Example 9.—17α-methyl-2-formyl-A-nor-5α-androst-1-en-17β-ol

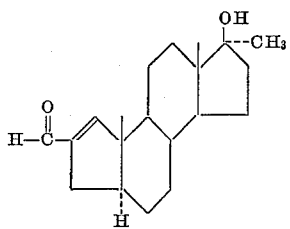

A solution of 600 mg. (1.97 mmoles) of 17α-methyl-2ξ-formyl-A-nor-5α-androstan-17β-ol, 600 mg. of 2,3-dichloro-5,6-dicyano-p-benzoquinone (2.6 mmoles), and 10 mg. of p-toluenesulfonic acid monohydrate in 20 ml. of dioxane was heated at reflux temperature for 2.5 hours. Benzene was added to the reaction mixture and white, crystalline quinol, weighing 470 mg., was removed by filtration. The filtrate was evaporated to dryness and then applied as a solution in benzene to 50 g. of neutral (activity III) alumina. Elution with benzene-petroleum ether (3:1) gave 120 mg. (20% yield) of 17α-methyl-2-formyl-A-nor-5α-androst-1-en-17β-ol; M.P. 146.0–149.0° C. (acetone-hexane); $\alpha_D^{23}+50°$ (c., 0.8 $CHCl_3$).

$\nu_{max.}^{CHCl_3}$ 3570, 3480 (OH), 1667 (C=O), 1580 (C=C) cm.$^{-1}$ $\lambda_{max.}^{EtOH}$ 239 mμ ($\epsilon$=12,600)

*Analysis.*—Calcd. for $C_{20}H_{30}O_2$: C, 79.42; H, 10.00. Found: C, 79.18; H, 9.87.

Likewise, 17α-ethyl -2ξ-formyl-A-nor-5α - androstan-17β-ol is dehydrogenated to 17α-ethyl-2-formyl-A-nor-5α-androst-1-en-17β-ol, and 17α-vinyl-2ξ-formyl-A-nor-5α-androstan-17β-ol is dehydrogenated to 17α-vinyl-2-formyl-A-nor-5α-androst-1-en-17β-ol.

Example 10.—2-formyl-A-nor-5α-androst-1-en-17β-ol bicyclo-[2.2.2]-octane-1′-carboxylate

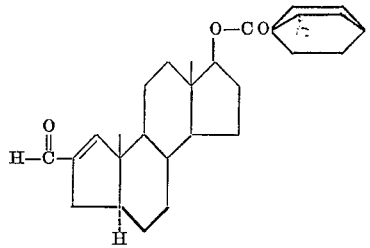

Ethyl bicyclo[2.2.2.]-octane-1-carboxylate (25 g.) [C. A. Grob, M. Ohta, E. Renk, A. Weiss, Helv. Chim. Acta, 41, 1191 (1958)] was saponified with 10 g. of potassium hydroxide in 100 ml. of methanol at reflux temperature for 24 hours. Acidification of an aqueous solution of the salt and extraction with ether gave the free acid. The acid was treated with 35 ml. of thionyl chloride containing one drop of dimethylformamide first at room temperature and then at reflux temperature for 1 hour. Excess thionyl chloride was removed under water pump vacuum and the residue was distilled through a spinning band column, giving 23.6 g. of bicyclo[2.2.2]-octane-1-carboxylic acid chloride, B.P. 78° C./3.5 mm.

A solution of 520 mg. (3 mmoles) of the acid chloride and 432 mg. (1.5 mmoles) of 2-formyl-A-nor-5α-androst-1-en-17β-ol in 5 ml. of dry pyridine was allowed to stand in a stoppered flask for 7 days and then poured into 100 ml. of water. Extraction with ether, followed by washing with 5% aqueous hydrochloric acid and then 5% aqueous sodium bicarbonate, drying, and evaporating in vacuo, gave 526 mg. of crude ester which was applied in benzene to a column of 30 g. of neutral (activity III) alumina. Elution with benzene-petroleum ether (1:1) gave 306 mg. of 2-formyl-A-nor-5α-androst-1-en-17β-ol bicyclo[2.2.2]-octane-1′-carboxylate which, after crystallization from acetone-hexane, was obtained as needles. M.P. 182–183° C.

$\lambda_{max.}^{EtOH}$ 240 mμ ($\epsilon$=15,000)

*Analysis.*—Calcd. for $C_{28}H_{40}O_3$: C, 79.20; H, 9.50. Found: C, 79.16; H, 9.40.

Using the above described procedure, the benzoate, phenylacetate or cyclohexane carboxylate of 2-formyl-A-nor-5α-androst-1-en-17β-ol are obtained with benzoic acid, phenylacetic acid or cyclohexanecarboxylic acid.

Example 11.—2-formyl-A-nor-5α-androst-1-en-17β-ol adamantane-1′-carboxylate

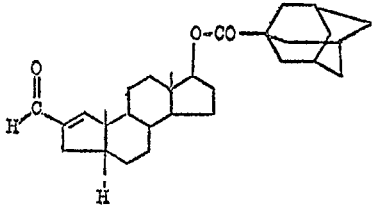

Adamantane-1-carboxylic acid (10 g.) [H. Stetter, H. Schwarz, A. Hirschhorn, Ber. 92, 1629 (1959)] was converted with thionyl chloride and a trace of dimethylformamide to the corresponding acid chloride (8.90 g.), B.P. 70°C./0.5 mm.

2-formyl-A-nor-5α-androst-1-en-17β-ol (576 mg., 2.0 mmoles), 300 mg. –1.5 mmoles) of adamantane-1-carboxylic acid chloride, 0.33 ml. (4 mmoles) of pyridine, and 25 ml. of benzene was heated at reflux temperature for 18 hours. The reaction mixture was cooled, diluted with ether, washed successively with 5% aqueous hydrochloric acid, water, 5% aqueous sodium bicarbonate, and saturated sodium chloride solution. The solvent was dried and evaporated, giving 767 mg. of solid which was chromatographed on 30 g. of neutral (activity III) alumina, to give 164 mg. of 2-formyl-A-nor-5α-androst-1-en-17β-ol adamantane-1′-carboxylate, M.P. 205–211° C. (from acetone-hexane).

$\lambda_{max.}^{EtOH}$ 240 mμ ($\epsilon$=15,000)

*Analysis*—Calcd. for $C_{30}H_{42}O_3$: C, 79.95; H, 9.39. Found: C, 80.06; H, 9.24.

The same procedure, applied to homoadamantane-1-carboxylic acid (see above-cited reference) affords 2- formyl-A-nor-5α-androst-1-en-17β-ol homoadamantane-1′-carboxylate.

Likewise, using the acid chlorides of acetic acid, propionic acid, valeric acid, or dodecanoic acid, 2-formyl-A-nor-5α-androst-1-en-17β-ol is converted to the corresponding 17β-acetate, propionate, valerate or dodecanoate.

Example 12.—2-formyl-A-nor-5α-androst-1-en-17-one

A solution of 0.50 g. of 2-formyl-A-nor-5α-androst-1-en-17β-ol in 3 ml. of dry pyridine was added to a mixture prepared by adding 0.5 g. of chromium trioxide to 8 ml. of dry pyridine at 15–25°C. The resulting dark solution was stirred at room temperature for 24 hours and then poured into 100 ml. of water containing 20 g. of sodium dihydrogen phosphate. Extraction with hexane and then ether gave, on evaporation of the washed and dried organic extracts, 0.37 g. of 2-formyl-A-nor-5α-androst-1-en-17-one; M.P. 149–154°C.

$\nu_{max.}^{CHCl_3}$ 1745 (C–17 C=O), 1676 (CHO), 1600 (C=C) cm.$^{-1}$

*Analysis*—Calcd. for $C_{19}H_{26}O_2$, C, 79.68; H, 9.15. Found: C, 79.59; H, 9.11.

A similar procedure applied to 2ξ-formyl-A-nor-5α-androstan-17-one.

Example 13.—Ethylene acetal of 2-formyl-A-nor-5α-androst-1-en-17β-ol

A mixture of 8.0 g. (28 mmoles) of 2-formyl-A-nor-5α-androst-1-en-17β-ol, 0.2 g. of p-toluenesulfonic acid, 10 ml. of ethylene glycol, and 100 ml. of benzene was heated under a reflux condenser fitted with a water trap for 18 hours. The mixture was then cooled and washed twice with 5% aqueous sodium bicarbonate. The benzene solution was washed with saturated aqueous sodium chloride, dried over sodium sulphate, and evaporated in vacuo, affording 8.5 g. of the ethylene acetal of 2-formyl-A-nor-5α-androst-1-en-17β-ol as a light yellow glass.

$\nu_{max.}^{CHCl_3}$ 3700, 3560 (OH) cm.$^{-1}$ (no band in carbonyl region)

The propylene acetal is obtained in the same manner, using 1,2-propylene glycol.

Example 14.—Ethylene acetal of 2-formyl-A-nor-5α-androst-1-en-17-one

Eight grams of the acetal of Example 13 dissolved in 25 ml. of pyridine, was added to the product obtained by adding 7.0 g. of chromium trioxide to 135 ml. of pyridine at 15–25°C., and the whole was stirred at room temperature for 48 hours. The mixture was filtered through sintered glass and the filter cake washed with three 100-ml. portions of 20% aqueous sodium dihydrogen phosphate, which was then added to the pyridine filtrate together with 700 ml. more of the 20% aqueous sodium dihydrogen phosphate. Extraction of the filter cake with ether and extraction of the pyridine-water mixture with ether gave, on combination of the dried ether extracts and evaporation in vacuo, 6.4 g. of the ethylene acetal of 2-formyl-A-nor-5α-androst-1-en-17-one.

$\nu_{max.}^{CHCl_3}$ 1740 cm.$^{-1}$ (C–17 C=O)

Example 15.—2-formyl-A-nor-5α-androst-1-en-17-one

A solution of 1.0 g. of the acetal of Example 14, 0.50 g. of p-toluenesulfonic acid, and 3 drops of water in 10 ml. of ethanol was allowed to stand at room temperature for 2 hours and then diluted with water and extracted with ether. The ether solution was washed with 5% aqueous sodium bicarbonate, dried, and evaporated, giving 0.778 g. of 2-formyl-A-nor-5α-androst-1-en-17-one, identical to the product which is obtained in Example 12.

Example 16.—Ethylene acetal of 17α-ethynyl-2-formyl-A-nor-5α-androst-1-en-17β-ol

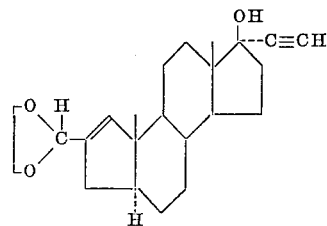

A solution of 6.4 g. of the ethylene acetal of 2-formyl-A-nor-5α-androst-1-en-17-one in 200 ml. of dry dimethylsulfoxide was treated with about 5 g. of sodium acetylide and the mixture was allowed to stand at room temperature for 3 days. The dark reaction mixture was poured into 1 liter of ice water and the aqueous mixture was extracted with ether, giving 6.67 g. of the ethylene acetal of 17α-ethynyl-2-formyl-A-nor-5α-androst-1-en-17β-ol.

$\nu_{max.}^{CHCl_3}$ 3330 cm.$^{-1}$ (C≡CH)

Example 17.—17α-ethynyl-2-formyl-A-nor-5α-androst-1-en-17β-ol

A solution of 6.6 g. of the acetal of Example 16, with 1.0 g. of p-toluenesulfonic acid and 10 ml. of water in 30 ml. of ethanol, was allowed to stand at room temperature for 7 hours, and then poured into water. The aqueous mixture was extracted with ether and the ether washed with 5% aqueous sodium bicarbonate and dried. Evaporation of the solvent in vacuo gave a glass which was chromatographed on 200 g. of neutral (activity III) alumina to give about 4.6 g. of 17α-ethynyl-2-formyl-A-nor-5α-androst-1-en-17β-ol.

$\nu_{max.}^{CHCl_3}$ 3330, 1675, 1585 cm.$^{-1}$

Tests on experimental animals show that the 2-formyl-A-nor-steroids described in this specification are generally of the androgenic type. Their useful properties include the ability to inhibit the production of pituitary gonadotrophin, a favorable ratio of anabolic to androgenic activity, and antifertility activity.

For example, when 50 mg. per day of 17α-methyl-2-formyl-A-nor-5α-androstan-17β-ol was injected into the castrate member of an intact female-castrate female parabiotic pair of rats, it caused a marked diminution of ovarian weight in the intact rat compared to the ovarian weight in an untreated parabiotic pair. Thus, the test compound inhibits castration-induced hypersecretion of pituitary gonadotrophin.

In the well known Hershberg test for anabolic and androgenic activity, 2-formyl-A-nor-5α-androstan-17β-ol, 2-formyl-A-nor-5α-androst-1-en-17β-ol, and the bicyclo [2.2.2]-octane-1′-carboxylate of 2-formyl-A-nor-5α-androst-1-en-17β-ol show a more favorable ratio of anabolic to androgenic activity than testosterone.

Antifertility activity is exhibited by 2-formyl-A-nor-5α-androstan-17β-ol. Female rats receiving 5.0 mg./day of this compound beginning after ovulation and after mating had no uterine implantation sites.

17α-methyl-2-formyl - A - nor-5α-androst-1-en-17β-ol shows, in young male rats, androgenic, anabolic and antigonadotrophic activity.

The 2α-(cyanoamidino)-A-nor-5α-androstanes of the invention are useful in preparing the 2-formyl-A-nor-steroids.

The acetals of the 2-formyl steroids are useful as precursors to C–17 modified 2-formyl steroids; e.g., oxidation, reduction, or addition reactions can be carried out on the C–17 position while leaving intact the protected formyl group at C–2. Examples 13–17 demonstrate this useful reaction sequence.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound selected from the class consisting of
(1) 2-formyl-A-nor-5α-androstane derivatives of the formula

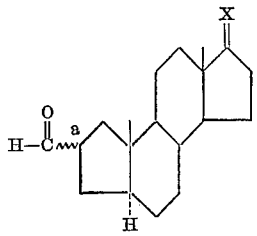

wherein X is =O or the group

is hydrogen or a hydrocarbon acyl group of 1 to 12 carbons; $R^2$ is H, $CH_3$, $C_2H_5$, $CH=CH_2$ or $C\equiv CH$; and $a$ is a single bond or a double bond;
(2) the acetals of the steroids of part (1) with ethylene or 1,2-propylene glycol; and
(3) 2α-(cyanoamidino)-A-nor-5α-androstane derivatives of the formula

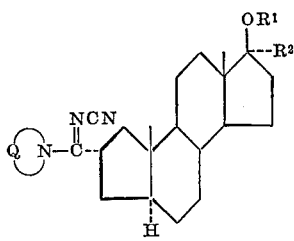

wherein $R^1$ and $R^2$ are as above and Q is alkylene of 4–5 chain carbon atoms and a total of 4–6 carbon atoms, or is 3-oxa-1,5-pentylene.

2. A compound of claim 1 of the formula

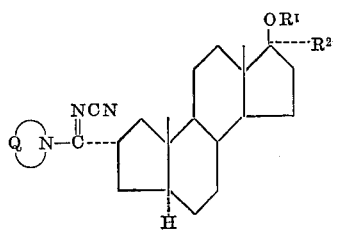

wherein $R^1$, $R^2$ and Q are defined as in claim 1.

3. The compound of claim 1 having the chemical name 17α-methyl-2-formyl-A-nor-5α-androstan-17β-ol.

4. The compound of claim 1 having the chemical name of 2-formyl-A-nor-5α-androstan-17β-ol.

5. The compound of claim 1 having the chemical name 2-formyl-A-nor-5α-androst-1-en-17β-ol.

6. The compound of claim 1 having the chemical name 2-formyl-A-nor-5α-androst-1-en-17β-ol bicyclo-[2.2.2]-octane-1′-carboxylate.

7. The compound of claim 1 having the chemical name 17α-methyl-2-formyl-A-nor-5α-androst-1-en-17β-ol.

8. The compound of claim 1 having the chemical name 17α-ethynyl-2-formyl-A-nor-5α-androst-1-en-17β-ol.

9. A process for preparing 2α-(cyanoamidino)-A-nor-5α-androstane derivatives of the formula

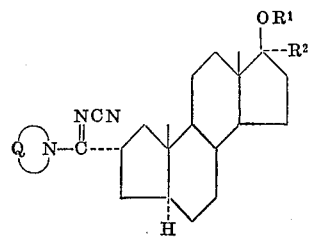

wherein $R^1$ is hydrogen or a hydrocarbon acyl group of 1 to 12 carbons; $R^2$ is H, $CH_3$, $C_2H_5$, $CH=CH_2$ or $C\equiv CH$, and Q is alkylene of 4–5 chain carbon atoms and a total of 4–6 carbon atoms, or is 3-oxa-1,5-pentylene which comprises reacting at a temperature between about 0° and 50° C. in a dry inert solvent, cyanogen azide with a steroid of the formula

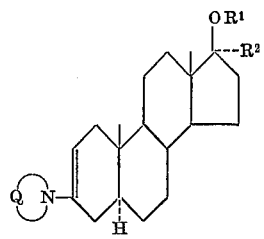

wherein $R^1$, $R^2$ and v are defined as above.

10. A process for preparing compounds of the formula

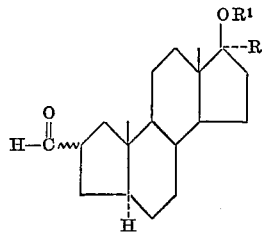

wherein $R^1$ is hydrogen or a hydrocarbon acyl group of 1 to 12 carbon atoms, and $R^3$ is H, $-CH_3$, $-C_2H_5$ or $CH=CH_2$ which comprises reacting a compound of the formula

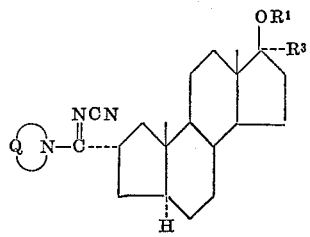

wherein $R^1$ and $R^3$ are as defined above and Q is alkylene of 4–5 chain carbon atoms and a total of 4–6 carbon atoms, or 3-oxa-1,5-pentylene, with an alkali metal at a temperature of between about −80° and +20° C. in an anhydrous liquid medium selected from a 1–2 carbon monoalkylamine or ammonia, and hydrolyzing the reaction product under neutral to basic conditions.

References Cited

Marsh et al., J. Am. Chem. Soc. vol. 86 pp. 4506–7 (1964).

NICHOLAS S. RIZZO, *Primary Examiner.*

JOSE TOVAR, *Assistant Examiner.*

U.S. Cl. X.R.

260—24.5, 294.7, 294.3, 326.5, 326.3, 340.9, 488, 586, 239.5, 239.55, 999; 167—74

UNITED STATES PATENT OFFICE
CERTIFICATE OF CORRECTION

Patent No. 3,424,751                                                        January 28, 1969

Richard M. Scribner

It is certified that error appears in the above identified patent and that said Letters Patent are hereby corrected as shown below:

Column 1, lines 20 to 25, that portion of the formula reading:

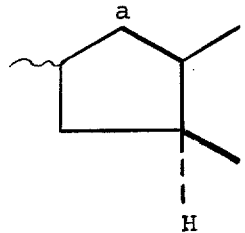 should read 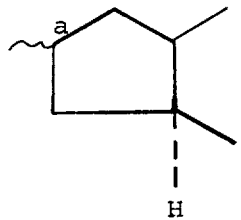

Column 13, line 28, before "is hydrogen" insert -- $R^1$ --. Column 14, line 30, "v" should read -- q --.

Signed and sealed this 14th day of April 1970.

(SEAL)
Attest:

EDWARD M. FLETCHER, JR.                                          WILLIAM E. SCHUYLER, JR
Attesting Officer                                                        Commissioner of Patents